(12) United States Patent
Riggs

(10) Patent No.: US 8,991,484 B2
(45) Date of Patent: Mar. 31, 2015

(54) ROTATING HEAD

(76) Inventor: Blaise P. Riggs, Midland, TX (US)

( * ) Notice: Subject to any disclaimer, the term of this patent is extended or adjusted under 35 U.S.C. 154(b) by 664 days.

(21) Appl. No.: 13/195,471

(22) Filed: Aug. 1, 2011

(65) Prior Publication Data
US 2013/0032359 A1 Feb. 7, 2013

(51) Int. Cl.
*E21B 23/00* (2006.01)
*F16L 25/00* (2006.01)
*E21B 33/08* (2006.01)
*F16L 23/10* (2006.01)
*F16L 27/08* (2006.01)

(52) U.S. Cl.
CPC ............ *E21B 33/085* (2013.01); *F16L 23/10* (2013.01); *F16L 27/0804* (2013.01)
USPC ......... 166/84.3; 166/84.1; 175/209; 285/420; 277/336

(58) Field of Classification Search
CPC ........ E21B 33/085; F16L 23/08; F16L 23/10; F16L 27/084
USPC ........ 166/378, 84.3, 387, 84.1; 285/409, 420; 277/323, 326; 175/209
See application file for complete search history.

(56) References Cited

U.S. PATENT DOCUMENTS

| | | | |
|---|---|---|---|
| 2,770,060 A * | 11/1956 | Rentschler | 49/396 |
| 2,995,196 A * | 8/1961 | Gibson et al. | 175/7 |
| 3,934,887 A * | 1/1976 | Biffle | 166/84.3 |
| 5,137,084 A | 8/1992 | Bearden | |
| 5,647,444 A | 7/1997 | Williams | |
| 5,901,964 A * | 5/1999 | Williams et al. | 277/326 |
| 7,766,100 B2 | 8/2010 | Williams | |
| 7,870,896 B1 | 1/2011 | Pruitt | |
| 2005/0000698 A1 * | 1/2005 | Bailey et al. | 166/387 |

* cited by examiner

*Primary Examiner* — Jennifer H Gay
*Assistant Examiner* — George Gray
(74) *Attorney, Agent, or Firm* — Susanne M Moore

(57) ABSTRACT

A rotating head having a bearing assembly removably seated in a bowl housing such that a top end of the bearing assembly sits flush with a top end of said bowl housing, the bowl housing having a tapered interior body, and the bearing assembly having a tapered exterior slightly smaller in diameter than, but conforming to the shape of the interior body of the bowl housing, the bearing assembly further comprising a stripper rubber, a bearing cap having an upper seal, a lower seal, bearings, and a snap ring holding the bearing assembly together and the bowl housing further having a dual hinge clamp assembly.

12 Claims, 4 Drawing Sheets

ROTATING HEAD

CROSS REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO JOINT RESEARCH AGREEMENT

Not Applicable

REFERENCE TO SEQUENCE LISTING

Not Applicable

DESCRIPTION OF ATTACHED APPENDIX

Not Applicable

BACKGROUND OF THE INVENTION

1. Field of the Invention

This invention relates generally to rotating heads used with rotary drilling rigs in well drilling, primarily oil and gas wells. The disclosed is an improved rotating head that is easier to use and maintain, can be used with smaller drilling rigs and that has dramatic improvement in the sealing capabilities of the bearing assembly, even under high pressure conditions.

Rotating heads are known in the art to be a sealing device used to control the direction of the drilling fluid cuttings as they return to the surface, and to close off the annular space around the kelly in drilling with pressure at the surface. Rotating heads are usually installed above the main blowout preventers and make it possible to drill ahead even when there is pressure in the annulus that the weight of the drilling fluid is not overcoming (preventing the well from blowing out). The rotating head helps insure the safety of the rig personnel, equipment and environment. It can also lower drilling costs and increase well productivity.

2. Description of Related Art

U.S. Pat. No. 7,870,896 issued Jan. 18, 2011 describes an improved rotating head that utilizes a box assembly and an integrated wear surface to seal the bearing elements. It describes the need for improved sealing, lubricating and cooling of bearings to maximize the useful life of the bearings. Part of the reason this is so important is because downtime of the drilling rig for maintenance is extremely costly for the operating companies, who need to keep the drilling rigs running almost non-stop.

U.S. Pat. No. 5,647,444 issued on Jul. 15, 1997 describes a stationary bowl designed to support a blowout preventor bearing assembly. It receives a swivel ball that cooperates with the bowl to self-align the blowout preventor bearing assembly and the swivel ball with respect to the fixed bowl.

U.S. Pat. No. 5,137,084 describes a rotating head having a bowl assembly and a rotating assembly disposed in a bowl opening formed in the bowl assembly where the rotating bushing bearingly contacts a portion of the bowl assembly during the operation of the rotating head and where the rotating assembly is removable from the bowl assembly and can be replaced with another rotating assembly thereby simultaneously replacing the elastomeric member and the rotating bushing.

With regard to known rotating heads, most are large, bulky, heavy and difficult to perform maintenance on. The bearing assembly typically extends vertically up from the bowl housing a good eight to eleven inches, making the entire device to tall and large to use with smaller drilling rigs.

Rotating heads typically have bearing assemblies that are not internally sealed, requiring the operators to continually run oil in the bearing assembly to keep the bearings lubricated and to prevent the bearings from seizing. The clamping system on most rotating heads is typically a one-piece buckle type mechanism that requires a great deal of space to open and a great deal of strength and force to close.

There is a need for an improved rotating head that is smaller, less bulky and easier to maneuver and work on in the field. There is a need for an improved rotating head that requires less maintenance and is easier to perform maintenance on when it is required. There is a need for an improved rotating head that has superior sealing capabilities to improve performance and lifespan. There is a need for an improved rotating head that reduces the down time associated with bearing assembly malfunctions. There is a need for a rotating head that can be used with smaller drilling rigs.

SUMMARY OF THE INVENTION

In accordance with the present invention, an improved rotating head is disclosed that has the below described characteristics and advantages.

An objective of the disclosure is a rotating head that does not require flowing lubricant.

An objective of the disclosure is a rotating head that can be used with smaller drilling rigs.

An objective of the disclosure is a rotating head that can continue to temporarily operate even if the bearing assembly malfunctions.

An objective of the disclosure is a rotating head that can hold pressure even at high pressure and with lower viscosity fluids.

An objective of the disclosure is a rotating head that is easier and quicker to tear down and rebuild.

An objective of the disclosure is a rotating head that has improved bearing sealing capabilities.

Other advantages of the present invention will become apparent from the following descriptions, taken in connection with the accompanying figures, wherein, by way of illustration and example, an embodiment of the present invention is disclosed.

BRIEF DESCRIPTION OF THE DRAWINGS

The figures constitute a part of this specification and include exemplary embodiments to the invention, which may be embodied in various forms. It is to be understood that in some instances various aspects of the invention may be shown exaggerated or enlarged to facilitate an understanding of the invention. To enable more thorough understanding of the features and advantages of the present invention, reference is now made to the detailed description of the invention along with the accompanying figures in which.

DETAILED DESCRIPTION OF THE PREFERRED EMBODIMENTS

Figure 1:
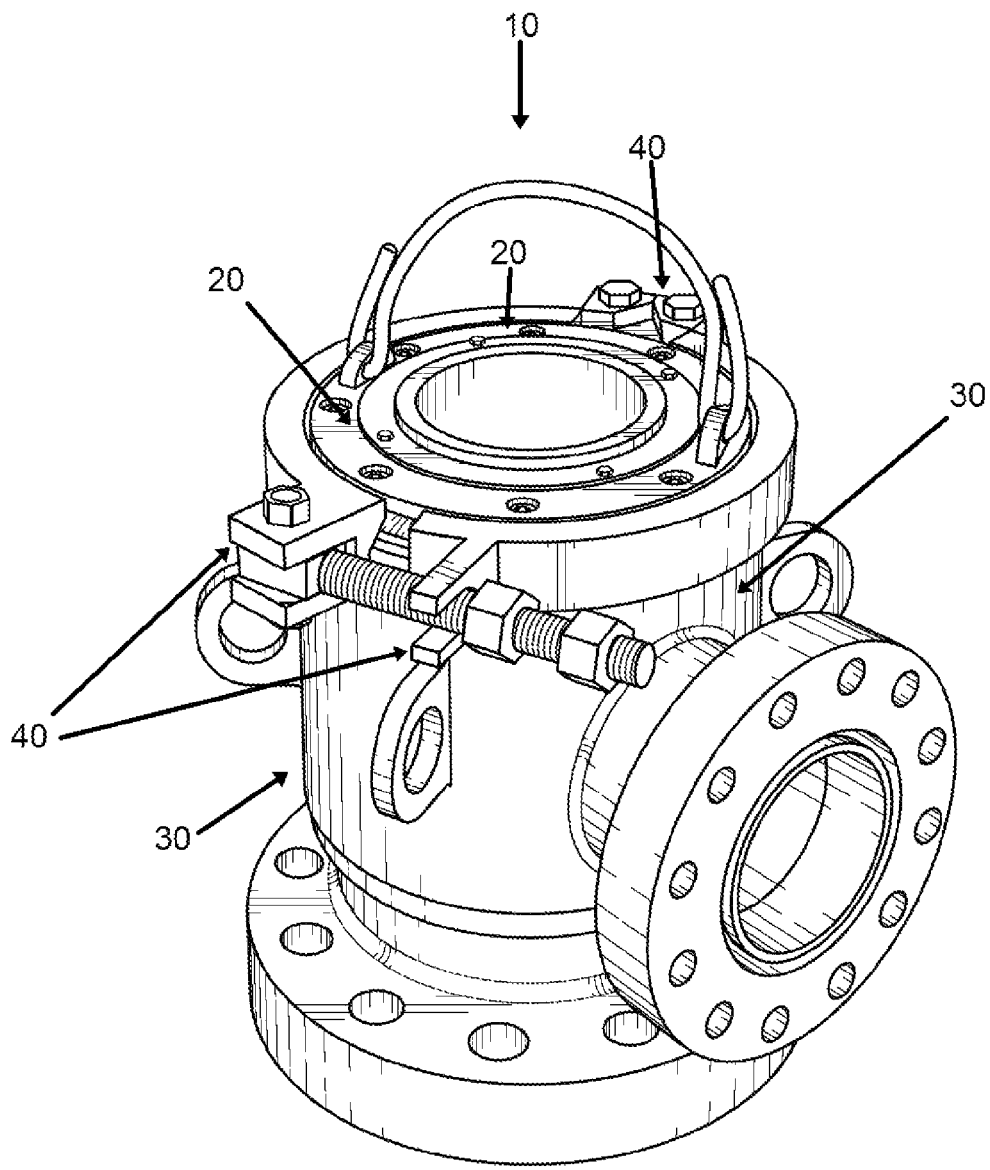
FIG. 1 is a perspective view of the preferred embodiment of the disclosed apparatus.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

One of the common encountered difficulties encountered with use of a rotating head on a drilling rig is that the rotating heads are large, heavy, bulky and exceedingly difficult to maneuver and perform maintenance on. Another difficulty is that rotating heads have constantly rotating bearings that require a steady source of lubrication. Failure in the lubrication or in the sealing capabilities requires the rotating head to be torn down and worked on. While this is occurring, the drilling rig is similarly out of commission and the oil companies are losing revenue. Since every minute that the drilling rig is inoperable results in lost revenue, it becomes imperative that rotating heads be designed to require less maintenance and to be easier to work on.

Because rotating heads are used primarily for safety reasons, it is important that they be used on all sizes of drilling rigs, yet the known rotating heads on the market are far too heavy, bulky and cumbersome for smaller drilling rig use. As a result, smaller drilling rigs are unable to incorporate the use of rotating heads and are more dangerous in operation.

When rotating heads break down, the operator must use a forklift to extract the bearing assembly from the bowl housing. Known rotating heads use a single hinge clamp/buckle assembly that secures the top of the bowl housing around the bearing assembly. These clamp/buckle assemblies are extremely difficult to close, requiring a great deal of strength and force to cause the clamp/buckle to snap into place. Opening the hinge/clamp poses similar disadvantages. The operator requires a great deal of room to open the band enough to get the bearing assembly out of the bowl housing. Smaller drilling rigs simply do not have enough room for this to occur.

The disclosed improved rotary head solves this problem by use of a novel dual hinge clamp assembly that enables one operator to easily open and close the band, even in a small space.

Known rotating heads having a tapered head typically incorporate a notch or locking assembly by which the bearing assembly clicks into place into the housing. Again this system can be a detriment because when the bearings within the bearing assembly fail the entire drilling must be stopped until such time as technicians can arrive, strip down the unit and replace bearings, lubrication and other parts.

The disclosed apparatus does not utilize a notch or locking assembly, rather the tapered bearing assembly fits perfectly into the corresponding tapered bowl housing which, when combined with the novel clamp assembly, results in an extraordinarily secure fit.

Several surprising advantages have resulted from this secure fit arrangement. First, the apparatus as a whole exhibits far superior sealing capabilities, enabling it to be used higher pressure situations and decreasing the maintenance required. Second, even if some of the internal bearings malfunction, the entire bearing assembly may temporarily be used as its own bearing by allowing it to continue rotating within the housing. These are tremendous and surprising advantages. It means that the drilling rig can continue to run for a limited period of time until such time as the failure can be fixed. This is a novel and exciting improvement that will decrease downtime costs.

Turning to the illustrations, as exhibited in FIG. 1, the improved rotating head 10 exhibits a bearing assembly 20 that is removably seated within the bowl housing 30, the top of the bearing assembly 20 seated substantially flush with the top of the bowl housing 30. There are no known rotating heads with this design, as with known designs the bearing assembly protrudes up vertically from the top of the bowl housing by at least several inches. The fact that the full bearing assembly 20 seats down inside the bowl housing 30 enables superior sealing, especially when used in conjunction with the dual hinge clamp assembly 40. The dual hinge clamp assembly 40 further enables far easier opening and closing of the bowl housing 30 to enable access and maintenance to the bearing assembly 20.

Figure 2:
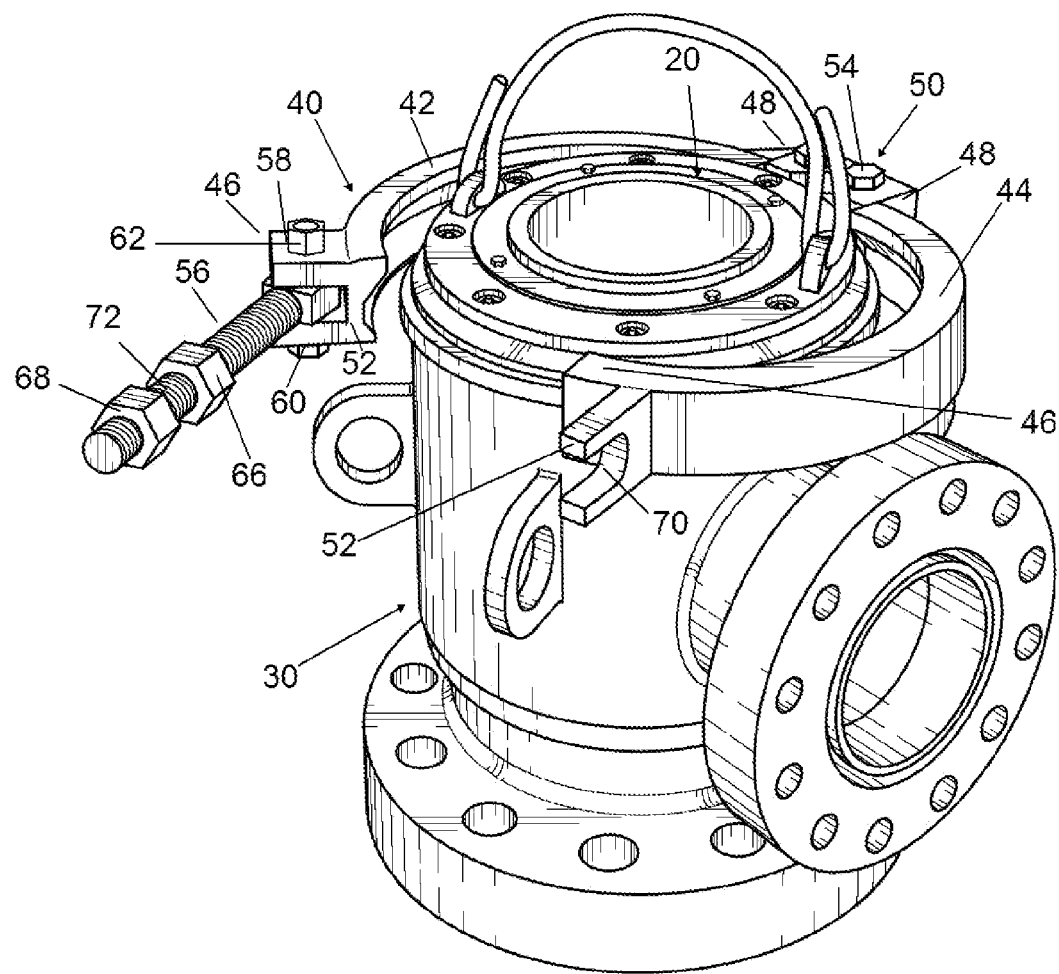
FIG. 2 is a perspective view of the clamping mechanism of the disclosed apparatus.

FIG. 2 depicts a closer view of the components of the dual hinge clamp assembly 40, showing the clamp assembly 40 open. The clamp assembly 40 secures the top of the bowl housing 30 around the bearing assembly 20. The clamp assembly 40 is comprised of a first curved band 42 and a second opposing curved band 44, each band encircling one half of the top of the housing 30 and each band having a free end 46 and a fixed end 48. The fixed ends 48 of each band culminate at one side of the bowl housing 30 in a limited range of motion first hinge 50. The free ends 46 of each band culminate on the opposing side of the bowl housing 30 in a second hinge 52 that enables opening and closing of the bands. The fixed end 48 of each band comprises an upper threaded aperture and a lower threaded aperture, the two openings forming a vertical path through which aperture a threaded bolt 54 vertically communicates, allowing each fixed end 48 of each band to rotate in a limited range of motion around the bolt 54.

The free ends 46 of each band culminate in a second hinge 52 that can be fully opened or closed by a horizontally placed threaded bolt 56 communicating from the free end 46 of the first band 42 to the free end 46 of the second band 44. The free end 46 of the first band 42 culminates in an upper aperture 58 and a lower aperture 60 through which one or more vertical bolts 62 pass, securing the head of the horizontally placed threaded bolt 56 that is held between the apertures. At the horizontally placed threaded bolt 56 end are two nuts 66, 68 spaced apart. The free end 46 of the second band 44 has a notch 70 into which the threaded bolt body 72 rests, the first nut 66 tightening against the front of the notch 70 and the second nut 68 tightening against the backside of the notch 70, to secure closure of the clamp assembly 40.

In practice, when the second nut 68 is loosened, the threaded bolt 56 end is freed from the notch 70, swinging outward. Simultaneously both bands swing outward as the fixed ends rotate around their bolts enabling the bands to be opened and the bearing assembly to become accessible for upward removal.

This design enables the two opposing bands be opened or closed with relatively little space or effort on the part of the user and is a dramatic improvement over the existing rotating head clamp assemblies which require great strength and force to open and close, as well as sufficient room to swing one side open. Although the details of the hinges are described herein as a preferred embodiment, other variations can be embodied, provided the opening of the second hinge enables both bands to swing outward as described.

Figure 3:
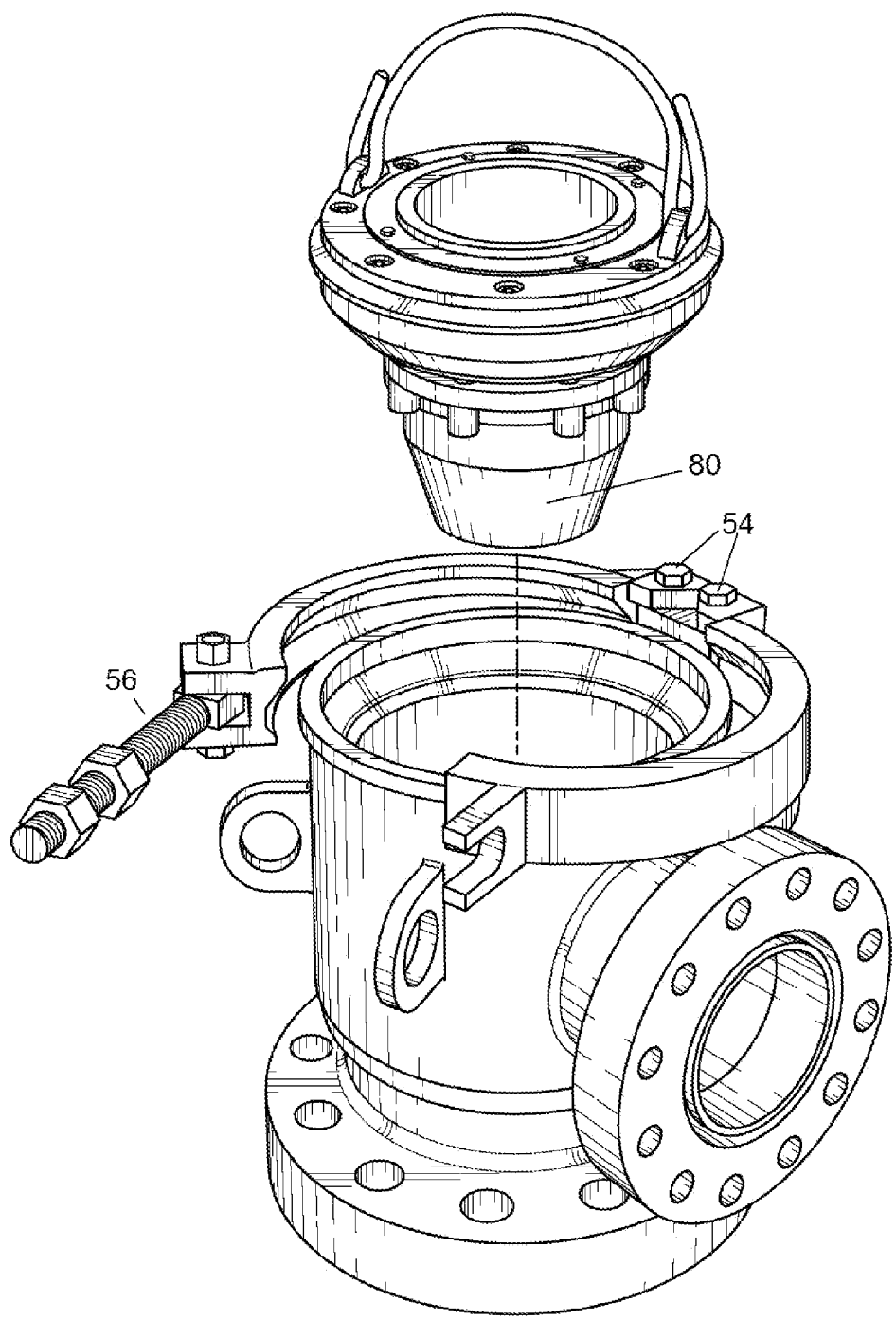
FIG. 3 is a perspective view of the bearing assembly of the disclosed apparatus.

Turning to FIG. 3, the bearing assembly is shown close up, prior to being dropped into the bowl housing. Visible is the tapered cone shape of the lower body of the bearing assembly, which tapered shape fits perfectly into a correspondingly tapered cone shape of the bowl housing, ensuring a secure fit. The stripper rubber 80 is depicted in this figure. Stripper rubbers are used to provide a seal around the rotating portion of the rotating head. The preferred embodiment disclosed herein is, however, novel in that it is made of polyurethane. The stripper rubber may be made of other materials, however polyurethane has been found to have advantages with the disclosed design.

Figure 4:
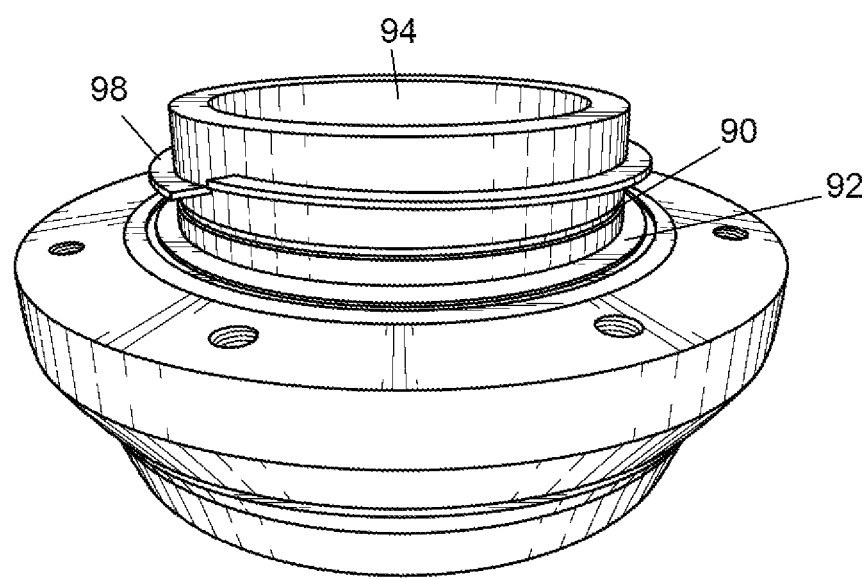
FIG. 4 is a closeup side perspective view of aspects of the bearing assembly.

FIG. 4 is a close-up view of the top of the bearing assembly. Visible is the upper seal 90, lower seal 92, the bearing cap 94 and a machined groove 96 on the interior of the cap 94 into which a snap ring 98 aligns, securing the bearing assembly. The machined groove and snap ring component are novel improvements. Known rotating heads typically incorporate hub nuts or hub bolts to secure the bearings. Use of the snap ring has enabled the disclosed improved rotating head to be easier and quicker to rebuild and also has decreased the size of the bearing assembly, enabling a smaller bowl housing and the associated advantages described herein with regard to a smaller overall rotating head. In the preferred embodiment, O-rings are used for the seals although other alternatives such as gaskets are possible.

The novel attributes of the improved rotating head, including the seals, the snap ring, the machined groove, the tapered cone shape of the bearing assembly and the bowl housing, the way the bearing assembly sits flush down in the bowl housing and the clamp assembly, contribute to the improved sealing capabilities, functioning and the ability of the rotating head to continue limited operation even if some of the internal bearings malfunction.

The tremendous sealing capabilities of the novel design enable the disclosed improved rotating head to function under considerably higher pressure than traditionally known rotating heads. The novel design of the clamp assembly combined with the way the bearing assembly seats in the bowl housing actually, upon closure, forces the bearing assembly to seat down even farther into the bowl housing, further improving the seal and functioning.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It is to be understood that the embodiments disclosed herein are shown for illustrative purposes and are not intended to be construed as limitations of the disclosed method and system. Those skilled in the art will recognize or be able to ascertain in the course of routine experimentation, that variations and equivalents of the embodiments may be undertaken without departing from the scope of the invention.

Certain terms are used throughout the description to refer to particular method components. As one skilled in the art will appreciate, design and manufacturing companies may refer to a component by different names. This document does not intend to distinguish between components that differ in name but not function.

The terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection or through an indirect connection via other intermediate devices and connections. Moreover, the term "method" means "one or more components" combined together. Thus, a method can comprise an "entire method" or "sub methods" within the method.

The use of the word "a" or "an" when used in conjunction with the word "comprising" may mean "one", or may also mean "one or more." The use of the term "or" in the claims is used to mean "and/or" unless explicitly indicated to refer to alternatives only or the alternatives are mutually exclusive, although the disclosures supports a definition that refers to only alternatives and "and/or."

The methods and systems disclosed and claimed herein can be made and executed without undue experimentation based on the level of disclosure presented. While the methods and systems have been described in terms of their preferred embodiments, it will be apparent to those skilled in the art that they are not limited to the exact steps described and may vary from such description without departing from the scope and spirit of the invention. The substitutes and modifications employed by one skilled in the art are deemed to fall within the scope of the invention.

What is claimed is:

1. A rotating head comprising a bearing assembly removably seated entirely in a bowl housing, such that a top end of the bearing assembly sits flush with a top end of said bowl housing, the bowl housing having a tapered interior body and the bearing assembly having a tapered exterior body slightly smaller in diameter than, but conforming to the shape of the bowl housing interior body, the bearing assembly being further secured into the housing by closure of a dual hinge clamp assembly, wherein the secured bearing assembly acts as a bearing by rotating within the housing.

2. The rotating head of claim 1 wherein the bearing assembly comprises a stripper rubber, a bearing cap having an upper seal, a lower seal, bearings, and a snap ring holding the bearing assembly together.

3. The rotating head of claim 1 wherein the stripper rubber comprises polyurethane.

4. The rotating head of claim 1 wherein the clamp assembly further comprises two curved bands, each encircling one side of the top end of the bowl housing and each having a free end and a fixed end, where both fixed ends culminate at one side in a first hinge and culminate on the opposing side in a second hinge, the second hinge comprising a locking mechanism for removably securing the two free ends together.

5. The rotating head of claim 1 wherein the bearing assembly is self-contained and internally sealed, such that flowing lubricant is not required.

6. A rotating head, the rotating head comprising:
   a bowl housing having a cone shaped interior, a top end and a bottom end;
   a bearing assembly having a corresponding cone shaped exterior of smaller diameter than the interior of the bowl housing, the bearing assembly comprising bearings, an upper and a lower seal, a stripper rubber, a bearing cap and a snap ring, the bearing assembly internally sealed and fitting securely within the bowl housing such that flowing lubrication is not required, the bearing assembly further comprising a top end and a bottom end, the top end of the bearing assembly being flush with the top end of the bowl housing;
   a dual hinge clamp assembly circumscribing the exterior of the bowl housing which, when tightened, wedges the bearing assembly against the bowl housing such that the bearing assembly acts as a bearing by rotating within the bowl housing.

7. The bearing assembly of claim 6 wherein O rings comprise the upper seal and the lower seal.

8. The bearing assembly of claim 6 wherein the stripper rubber is made of polyurethane.

9. The rotating head of claim 6 wherein the clamp assembly further comprises two curved bands, each encircling one side of the top end of the bowl housing and each having a free end and a fixed end, where both fixed ends culminate at one side in a first hinge and culminate on the opposing side in a second hinge, the second hinge comprising a locking mechanism for removably securing the two free ends together.

10. The clamp assembly of claim 9 wherein the second hinge comprises a horizontally placed threaded bolt communicating from the free end of the first band to the free end of the second band and secured by at least one nut.

11. The second hinge of claim 10 wherein the free end of the first band comprises an upper aperture and a lower aperture through which at least one bolt passes.

12. The second hinge of claim 10 wherein the free end of the second band has a notch into which the threaded bolt body rests, having a first nut against the front of the notch and a second nut against the backside of the notch.

* * * * *